UNITED STATES PATENT OFFICE.

EMILE J. GUAY, OF LYNN, MASSACHUSETTS, ASSIGNOR TO GENERAL ELECTRIC COMPANY, A CORPORATION OF NEW YORK.

LUBRICANT FOR NON-METALLIC GEAR-WHEELS.

1,304,477. Specification of Letters Patent. Patented May 20, 1919.

No Drawing. Application filed December 2, 1918. Serial No. 264,973.

*To all whom it may concern:*

Be it known that I, EMILE J. GUAY, a citizen of the United States, residing at Lynn, in the county of Essex, State of Massachusetts, have invented certain new and useful Improvements in Lubricants for Non-Metallic Gear-Wheels, of which the following is a specification.

Non-metallic gear wheels made from compressed spinnable textile fibers have gone into extensive use on account of their superior noiseless properties and long life. Such gears when in operation mesh with metallic gears and therefore require some sort of lubrication of which many kinds have been used with a considerable degree of success.

After extensive experiments and tests, I have discovered an improved lubricant for such non-metallic gears which is very much superior to anything heretofore available for the purpose and by means of which the life of the gears is greatly prolonged especially when subjected to heavy duty.

My improved lubricant comprises graphite mixed with a binder of an adhesive resinous character which hardens when exposed to the air. The graphite is mixed with the binder to form a paste and this paste is put on the teeth of the gear wheels. It immediately greases the gear wheels spreading over them in a thin coat after which the binder begins to dry. A non-metallic gear wheel has a rough surface as compared with a metallic gear wheel and as a result the lubricant runs into the many small interstices, filling them and forming a smooth coating over the surfaces of the gear teeth, and when the binder dries it adheres to the surface of the teeth forming a hard coating firmly held thereon. This coating then serves as a lubricant for the gear wheels until it wears off, after which more lubricant is applied. As will be clear, this prevents to a great extent any wear on the surfaces of the teeth of the non-metallic gear wheels and hence greatly prolongs the life of such gear wheels. For example, I have found by extensive comparative tests that the life of a certain type of non-metallic gear wheel, *i. e.* a gear wheel made of compressed spinnable textile fibers, is about three times as long when using the lubricant which I have discovered as it is when using the best obtainable gear greases of the ordinary type.

Various resinous binders may be used in making up my lubricant the primary essentials being that it dries in air and that it is adhesive. Preferably, however, I employ a binder comprising a resin dissolved in a suitable volatile solvent as alcohol, as they dry readily, give a hard surface, and stick well to the surfaces of the gear teeth. Also they are moisture proof and not easily affected by heat. I have found what is ordinarily termed liquid shellac, which is gum shellac dissolved in alcohol or other volatile solvent, very satisfactory, and this is the binder I prefer to use. As a specific example, I have found a mixture of between two and three pounds of graphite with one gallon of liquid shellac to be satisfactory, the liquid shellac comprising about eight pounds of flake shellac dissolved in one gallon of alcohol. It will be understood, of course, that these figures are given only by way of example and are not to be taken as a limitation of my invention.

What I claim as new and desire to secure by Letters Patent of the United States, is:—

1. As a lubricant for non-metallic gear wheels, a mixture of graphite and a resinous binder.

2. As a lubricant for non-metallic gear wheels, a mixture of graphite and liquid shellac.

In witness whereof I have hereunto set my hand this 27th day of November, 1918.

EMILE J. GUAY.